United States Patent [19]
Ueda

[11] Patent Number: 5,263,994
[45] Date of Patent: Nov. 23, 1993

[54] PRINTER HAVING A PLURALITY OF PRINTING MODES

[75] Inventor: Michio Ueda, Gamagori, Japan

[73] Assignee: Brother Kogyo Kabushiki Kaisha, Nagoya, Japan

[21] Appl. No.: 845,320

[22] Filed: Mar. 3, 1992

[30] Foreign Application Priority Data

Apr. 9, 1991 [JP] Japan ................... 3-103905

[51] Int. Cl.$^5$ ............................. B41J 9/50
[52] U.S. Cl. ................ 400/157.3; 400/708; 101/93.02
[58] Field of Search ........ 400/57, 121, 157.2, 400/157.3, 166, 167, 320, 322, 903, 708; 395/105; 101/93.02

[56] References Cited

U.S. PATENT DOCUMENTS

| | | | |
|---|---|---|---|
| 3,866,533 | 2/1975 | Gilbert et al. | 101/93.14 |
| 4,162,131 | 7/1979 | Carson, Jr. et al. | 400/124 |
| 4,162,858 | 7/1979 | Brandenburg | 400/124 |
| 4,189,246 | 2/1980 | Kane | 400/166 |
| 4,326,813 | 4/1982 | Lomicka, Jr. et al. | 400/124 |
| 4,569,607 | 2/1986 | Takemoto | 440/167 |
| 4,655,622 | 4/1987 | Aoki | 400/121 |
| 4,797,017 | 1/1989 | Okouchi | 400/157.3 |
| 4,933,867 | 6/1990 | Ishigaki | 400/120 |

FOREIGN PATENT DOCUMENTS

| | | | |
|---|---|---|---|
| 0159895 | 10/1985 | European Pat. Off. | 400/121 |
| 0263949 | 4/1988 | European Pat. Off. | 400/157.2 |
| 0264265 | 4/1988 | European Pat. Off. | 400/279 |
| 55-133981 | 10/1980 | Japan | 400/57 |
| 56-120374 | 9/1981 | Japan | 400/279 |
| 60-2197 | 1/1985 | Japan | 400/157.2 |

Primary Examiner—David A. Wiecking
Assistant Examiner—Steven S. Kelley
Attorney, Agent, or Firm—Oliff & Berridge

[57] ABSTRACT

The dot impact printer of the invention sets an optimum printing speed based on various factors, such as kanji or alphanumeric characters, and to set an optimum brake pulse and an optimum energizing energy corresponding to the set optimum printing speed. The printing mode is determined through a series of logic steps and optimum settings for the printing actions is selected according to the mode identified. Thus, in the invention, based on the print contents, a printing speed, an energizing period of time for the first dot, an energizing period of time for the following dots, a brake pulse width, a period of time till the generation of brake pulses and delay time, are changed.

12 Claims, 6 Drawing Sheets

| | | STANDARD SPEED | | | | 1.5-TIMES SPEED | 2-TIMES SPEED | 3-TIMES SPEED |
|---|---|---|---|---|---|---|---|---|
| | | A | B | C | D | | | |
| PRINTING SPEED(CPS) | | 150 | 150 | 140 | 130 | 200 | 280 | 370 |
| PRINTING MODE | | KANJI | ANK | IMAGE / MULTIPARTS PAPER / CHARACTER ORNAMENTATION | | 2-PASS PRINTING | ALL PRINTING MODES | ALL PRINTING MODES | ALL PRINTING MODES |
| ENERGIZING PULSE PERIOD ($\mu$S) | DP1 | 120 | 120 | 110 | 120 | 110 | 120 | 110 |
| | DP2 | 90 | 80 | 100 | 80 | 110 | 90 | 110 |
| | BP | 50 | 40 | 50 | 50 | 40 | 40 | 40 |
| Tc | | 200 | 200 | 180 | 200 | 200 | 210 | 200 |
| DT | | 60 | 60 | 60 | 30 | 30 | 60 | 17 |
| T | | 247 | 247 | 265 | 285 | 278 | 265 | 300 |

Fig.1

| PRINTING SPEED (CPS) | | STANDARD SPEED | | | | 1.5-TIMES SPEED | 2-TIMES SPEED | 3-TIMES SPEED |
|---|---|---|---|---|---|---|---|---|
| | | A | B | C | D | | | |
| | | 150 | 150 | 140 | 130 | 200 | 280 | 370 |
| PRINTING MODE | | KANJI | ANK | IMAGE | 2-PASS PRINTING | ALL PRINTING MODES | ALL PRINTING MODES | ALL PRINTING MODES |
| | | | | MULTIPARTS PAPER | | | | |
| | | | | CHARACTER ORNAMEN-TATION | | | | |
| ENERGIZING PULSE PERIOD (μS) | DP1 | 120 | 120 | 110 | 120 | 110 | 120 | 110 |
| | DP2 | 90 | 80 | 100 | 80 | 110 | 90 | 110 |
| | BP | 50 | 40 | 50 | 50 | 40 | 40 | 40 |
| | Tc | 200 | 200 | 180 | 200 | 200 | 210 | 200 |
| | DT | 60 | 60 | 60 | 30 | 30 | 60 | 17 |
| | T | 247 | 247 | 265 | 285 | 278 | 265 | 300 |

Fig.2B

| ITEM | INSTRUCTIONS |
|---|---|
| S1 | STANDARD SPEED ? |
| S2 | 1-PART PAPER ? |
| S3 | 1-PASS PRINTING ? |
| S4 | ARE THERE IMAGE DATA ? |
| S5 | SETTING OF STANDARD SPEED, C |
| S6 | ARE THERE KANJI DATA ? |
| S7 | SETTING OF STANDARD SPEED, A |
| S8 | SETTING OF STANDARD SPEED, B |
| S9 | SETTING OF STANDARD SPEED, D |
| S10 | 1-PASS PRINTING ? |
| S11 | SETTING OF STANDARD SPEED, C |
| S12 | SETTING OF STANDARD SPEED, D |
| S13 | SETTING OF 1.5-TIMES SPEED<br>SETTING OF 2-TIMES SPEED<br>SETTING OF 3-TIMES SPEED |

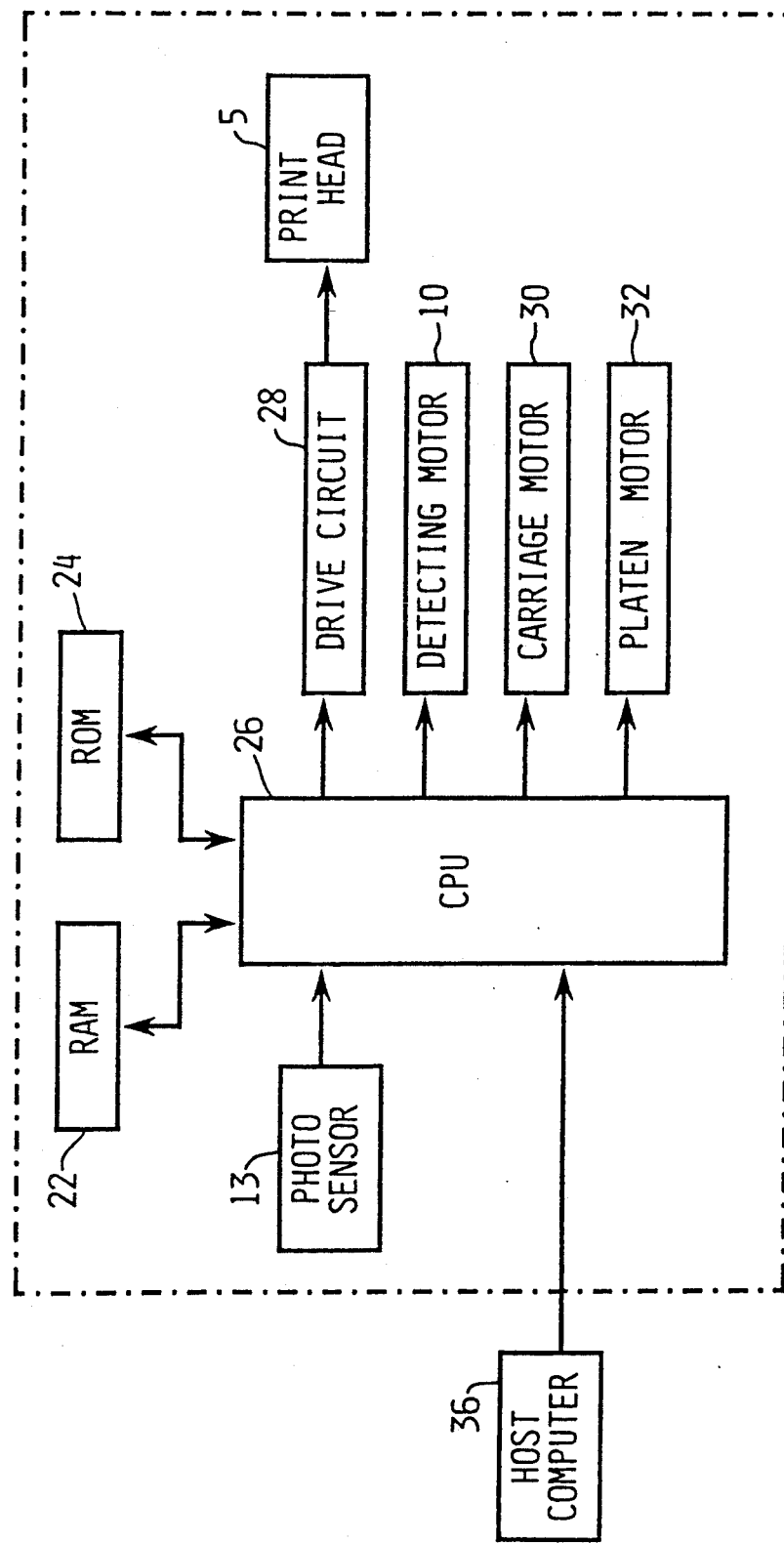

PRINTER HAVING A PLURALITY OF PRINTING MODES

BACKGROUND OF THE INVENTION

1. Field of the Invention

The invention relates to printers which are able to execute printing in a printing mode such as a kanji printing mode, an alphanumeric and kana (ANK) printing mode or a multi-parts paper printing mode.

2. Description of Related Art

In this type of printer, printing speed of the print head and the brake pulse width, during a period of time in which power is supplied to a print head in order to inhibit a printing wire from rebounding, are set independently of the printing mode. With this structure, printing has been executed at the same printing speed and with the same brake pulse width regardless of printing mode.

It has been known that to improve printing quality, in a printing mode for executing high density printing, the printing speed must be reduced, or a driving pulse width for forwarding a printing wire and the brake pulse width have to be wide. It has also been known that to improve printing efficiency, in a printing mode for executing low density printing, the printing speed has to be increased or the driving pulse width and the break pulse width have to be narrow. Therefore, when the printing speed, driving pulse width and break pulse width are set to be optimum for printing in a kanji printing mode, for example, and printing is executed in another printing mode which executes higher density printing than the kanji printing mode, the printing speed is too fast for a recovering time of a print head to execute continuous printing. As a result, the printing quality is reduced. While when printing is executed in still another printing mode which executes lower density printing than the kanji printing mode, the printing speed is slower than the speed required for executing printing without reducing printing quality. Further, the driving pulse width and the break pulse width are too wide, thus raising the temperature of the print head so that during printing the print head has to be stopped frequently to cool down. Consequently, the printing efficiency is reduced. Moreover, tearing or severing of printing paper may occur where there is too fast a printing speed and a wide driving pulse.

Therefore in the past, a suppressed, compromise setting value has been used, that is, a printing speed, a driving pulse width and a brake pulse width which are not too bad for any printing mode have been used. The result is problems in some printing modes. Even though a sufficient printing quality can be obtained during high speed printing, printing executed at a low speed does not make the most of the printing efficiency and in some printing modes the printing quality is degraded.

SUMMARY OF THE INVENTION

An object of the invention is to provide a printer in which an optimum printing speed and an optimum brake pulse width can be set corresponding to the printing mode being used thereby producing satisfactory printing quality and permitting printing at a highest allowable printing speed.

Such a printer has a printing speed setting means for selectively setting a plurality of printing speeds of a print head; brake pulse width setting means for selectively setting a plurality of brake pulse widths for an energizing period of time in which power is supplied to the print head in order to adjust the returning speed of a printing wire; and selecting means for selecting an optimum printing speed and an optimum brake pulse width based on a printing mode from the group of printing modes consisting of a kanji printing mode, an ANK printing mode, a multi-part paper printing mode and a two-pass printing mode.

The printer may have printing speed setting means for selectively setting a plurality of printing speeds of a print head; energy setting means of following energizing drive pulses for selectively setting energizing drive pulse energy for the printing of second and subsequent dots in a continuous dot train; and selecting means for selecting an optimum printing speed and an optimum following energizing pulse energy based on a printing mode from the group of printing modes consisting of a kanji printing mode, an ANK printing mode, a multi-part paper printing mode and a two-pass printing mode.

According to the means as described above, an optimum printing speed and an optimum brake pulse width can be selected by the selecting means based on the printing mode, such as a kanji printing mode, an ANK printing mode, or a multi-part paper printing mode, so that a satisfactory printing quality is obtained and also printing can be performed at the highest allowable speed for the chosen printing mode.

The same effect as mentioned above can be obtained in a structure in which an optimum printing speed and an optimum following energizing drive pulse energy are selected based on the printing mode such as a kanji printing mode, an ANK printing mode, or a multi-part paper printing mode.

As described above, the invention is able to obtain the effects as follows.

One aspect of the printer permits selecting the optimum printing speed and the optimum brake pulse width based on the printing mode in any printing mode producing satisfactory printing quality while printing at the highest allowable speed.

Another aspect of the printer structure is that the optimum printing speed and the optimum energizing drive pulse energy for the second and subsequent dots in a continuous dot train can be selected based on the printing mode to produce similar effects as that obtained with the printer previously described.

BRIEF DESCRIPTION OF THE DRAWINGS

The invention will be described with reference to the drawings in which:

FIG. 1 is a table showing the relationships between printing modes and printing conditions such as printing speeds;

FIG. 2B is a table of labels for the flow chart of FIG. 2A;

FIG. 6 is a block diagram of the printer.

DESCRIPTION OF THE PREFERRED EMBODIMENT

In the invention, there are four printing modes for the standard, or normal, printing speed. Other speed modes are also available. The printing characteristics of each mode of the standard printing speed are as follows. The table shown in FIG. 1 is stored in a ROM 24 of a dot impact printer 20 shown in FIG. 6.

Figure 3:
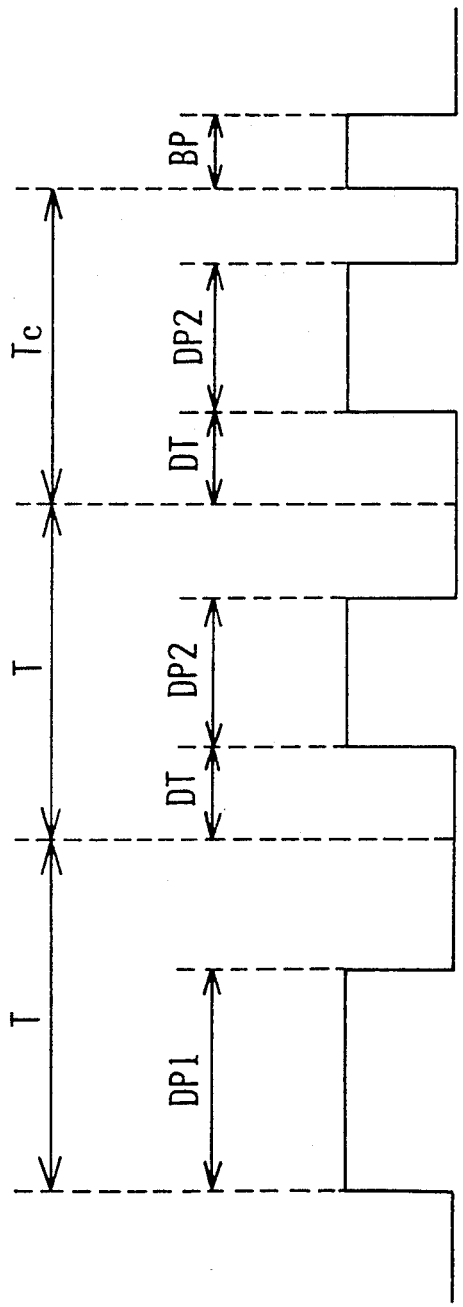
FIG. 3 is a time chart showing the energizing pulse periods of time for a print head.

The first mode consists of kanji printing. In the kanji printing mode it is desired to have a high printing speed and high density printing is executed, therefore, a rapid printing recovery speed is necessary. Thus, the printing conditions shown in column A of the standard speed column, of the table shown in FIG. 1, are set. In this mode, the brake pulse width (BP) is set (refer to FIG. 3), during which power is supplied to a print head, at 50 μs.

The second mode only includes ANK printing. The ANK printing mode is a mode in which numerals and alphabetical and kana letters are printed. Because these are less complex characters than kanji characters, i.e., the printing density is low, less energy is needed by the print head and the temperature rise in the print head can thereby be reduced. Therefore, the printing conditions shown in column B of the standard speed column, of the table shown in FIG. 1, are set.

In this mode, the brake pulse width (BP) is set at 40 μs and the energizing pulse period of time for the second and subsequent dot drive pulse (DP2) (refer to FIG. 3) (hereafter called the second dot drive pulse width (DP2)), that is, the energizing pulse period for the printing of dots for the second and successive dots in a continuous dot train, is set at 80 μs.

In this second mode for ANK printing described above, the brake pulse width (BP) and the energizing period of time for the second dot drive pulse width (DP2) are lowered so that the period of time in which power is supplied to the coil of a print head is shortened, and the temperature rise of the print head is suppressed, thereby reducing a cooling time for the print head and improving the printing efficiency.

Image printing, multi-part paper printing and character ornamentation printing are included in a third mode. Image printing is one in which patterns or graphs are printed. Multi-part paper printing is one in which multi-part paper, that is, more than 2 sheets of overlaid paper for making copies, is printed. Character ornamentation printing is where a pattern, such as a net pattern or an emphasizing pattern, is printed. Higher density printing is executed in these types of printing and when the printing speed is high, following-up or timely recovery becomes difficult. Therefore, to cope with this problem, the printing speed is lowered. Thus, the printing conditions shown in column C, of the standard speed column in the table of FIG. 1, are set and the printing speed is set at 140 cps.

The fourth mode includes two-pass printing. The two-pass printing mode is a mode in which the same place is printed two times. As a result, the printing paper can be broken if the printing impact is strong. To prevent this, the printing impact is weakened by making the printing speed low and the energizing drive pulse period of time for the second and subsequent dots of a continuous dot train of the print head (DP2) short. Specifically, the printing conditions shown in column D of the standard speed column, FIG. 1, are set. In this mode, the printing speed is set at 130 cps and the second dot drive pulse width (DP2) of the continuous dot train is set at 80 μs.

In the preferred embodiment, a delay time (DT), first dot drive pulse width (DP1), second dot drive pulse width (DP2), and brake pulse width (BP) are changed corresponding to the conditions as shown in the table of FIG. 1, and the sum of the delay time (DT) and the printing period of cycle T is made substantially constant (about 310 μs). The value depends on a driving system. When the delay time (DT) is too long for printing the second and successive dots, the printing action does not synchronize with the bound of the previous printing action and the printing impact becomes weaker than that for the first dot printing causing uneven ink density or printing.

Further in the preferred embodiment, the value of Tc, the period of time for printing the last dot of the continuous dot train prior to the brake pulse being generated (also defined as the last dot printing time), is also changed corresponding to conditions. When Tc is long, printing ghosts are unlikely to occur in short printing gaps. However, when Tc is longer than a certain value, based on the printing period for the first dot and the on-time brake pulses of the last dot of the continuous dot train, there is a tendency for printing ghosts to appear in long printing gaps. In a high density printing mode, it is preferable that Tc be long, however, if Tc is longer than a certain value printing quality is reduced. The proper values determined in consideration of the above-mentioned tendencies are shown in FIG. 1. The above-mentioned brake pulse width (BP) adjusts the returning speed of a printing wire after printing the last dot of the continuous dot train to prevent shadow printing in a position where printing is not originally intended that might be caused by vibration, or rebound, of the printing wire.

As described above, an optimum printing speed and an optimum brake pulse width, or an optimum printing speed and an optimum energizing period of time for the dots, for the second and successive dots of a continuous dot chain, can be properly selected by setting the printing conditions as shown in columns A, B, C and D in the standard speed column corresponding to the four printing modes.

Figure 2A:
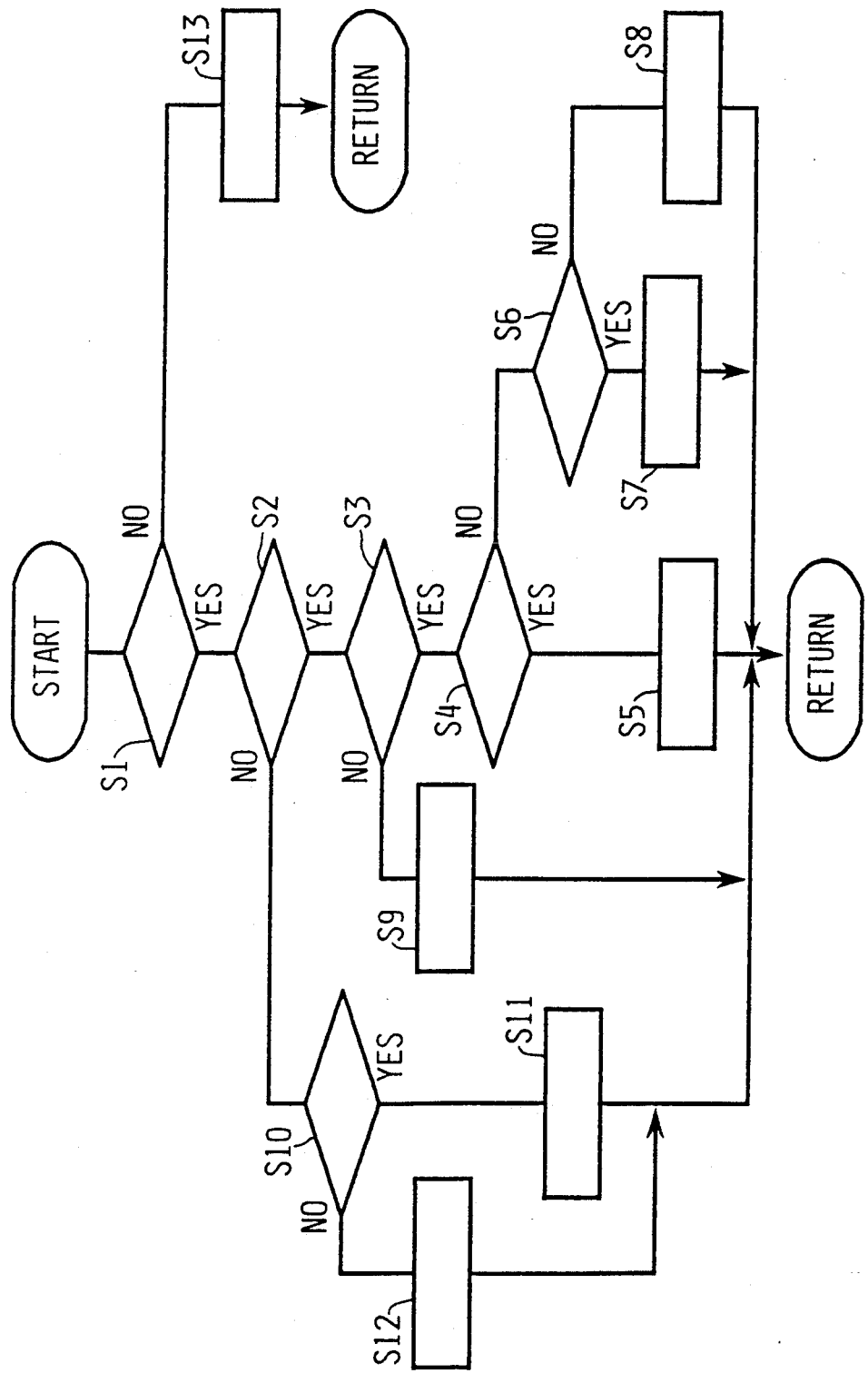
FIG. 2A is a flow chart of the printer control.

Next, a method for recognizing the printing mode from the various kinds of possible printing modes will be explained referring to the flow chart and table shown in FIGS. 2A and 2B and the block diagram shown in FIG. 6. The flow chart shows the contents of a control function, for setting printing conditions based upon recognizing the printing mode, included in the operation control programs stored in the ROM 24 of a control device of the printer 20 (FIG. 6 in block form).

The discrimination between one-part paper and multi-part paper is performed as follows. The thickness of the printing paper is detected using an automatic paper thickness detector, to be described later. When the thickness is more than 0.35 mm, the printing paper is judged to be multi-part paper by a CPU 26. The kanji printing, ANK printing, two-pass printing, image printing and a character ornamentation printing modes are recognized by the CPU 26 based on printing data supplied from a host computer 36 connected to the CPU 26.

The control for setting printing conditions is executed by the CPU 26, using programs and data stored in ROM 24 and data stored in RAM 22 (FIG. 6), based on the printing mode, will be explained referring to FIGS.

2A and 2B. At first, the printing mode is judged to determine if it is standard speed printing (step S1). If it is judged to be standard speed printing ("YES" in step S1), it is judged whether the printing paper is one-part paper (step S2). When it is one-part paper ("YES" in step S2), it is judged whether the printing mode is a one-pass printing mode (step S3) and if it is a one-pass printing mode, "YES" is selected.

In step S4, it is judged whether there are image data present. When there are image data ("YES" in step S4), they are to be printed in the image printing mode (the third group) so that the conditions shown in column C, in the standard speed column of FIG. 1, are set (step S5).

If there are no image data in step S4, "NO" is selected and it is judged whether there are kanji data present (step S6). When there are kanji data ("YES" in step S6) and they are to be printed in the kanji printing mode, the printing conditions shown in column A, in the standard speed column of FIG. 1, are set (step S7). When there are no kanji data ("NO" in step S6) then the data are to be printed in the ANK printing mode and the printing conditions shown in column B, in the standard speed column in FIG. 1, are set (step S8).

Back in step S3, when the printing mode is not one-pass printing, "NO" is selected, and printing is to be in the two-pass printing mode so that the conditions shown in column D, in the standard speed column in FIG. 1, are set (step S9). In step S2, when the printing paper is judged not to be one-part paper, "NO" is selected and it is further judged whether it is a one-pass printing mode (step S10).

When the printing mode is a one-pass printing mode ("YES" in step S10), it is in the multi-part paper printing mode so that the conditions shown in column C, in the standard speed column in FIG. 1, are set (step S11). In step S10, when the printing mode is not the one-pass printing mode ("NO"), the printing is to be in the two-pass printing mode so that the conditions shown in column D, in the standard speed column in FIG. 1, are set (step S12).

Step S1, when the printing mode is not the standard speed printing mode, "NO" is selected, and the printing mode is one of the modes of 1.5-times standard speed printing, 2-times standard speed printing or 3-times standard speed printing; therefore, one of the sets of printing conditions shown in the 1.5-times standard speed column, 2-times standard speed column or 3-times standard speed columns of FIG. 1 is set (step S13). In these three speed modes, the same printing conditions are used for all printing modes.

In the standard speed printing mode where a plurality of printing modes are mixed in a line, the printing conditions are set as described below. When the two-pass mode exists, for example, the conditions shown in column D, in the standard speed column, are set. In the case of a one-pass printing mode where an image printing mode, a character ornamentation printing mode and a multi-part paper printing mode are mixed in a line, or in the case of a manual mode (a mode in which a user sets a gap between the tip of a wire dot of a printing head and a platen), the conditions are set as shown in column C of the standard speed column. In the case of a one-pass printing mode in which both a kanji printing mode and an ANK printing mode exist, the printing conditions are set as shown in column A of the standard speed column. In the case of a one-pass printing mode, when only an ANK printing mode exists, the printing conditions are set as shown in column B of the standard speed column.

As described above, when each timing is determined, the CPU 26 supplies the pulses to a drive circuit 28 and power is supplied to the print head 5 from the drive circuit 28 according to the above-mentioned timing in the printing operation.

Figure 4:
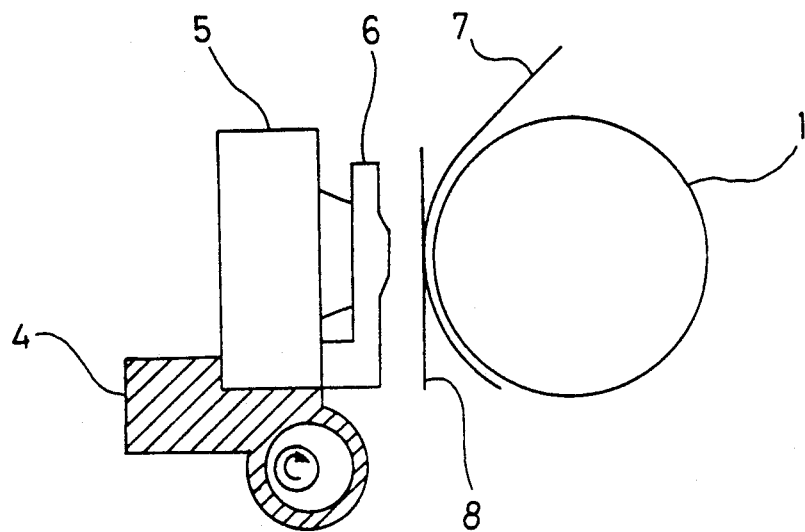
FIG. 4 is a longitudinal cross-sectional view showing a print head, a platen and their surroundings.
Figure 5:
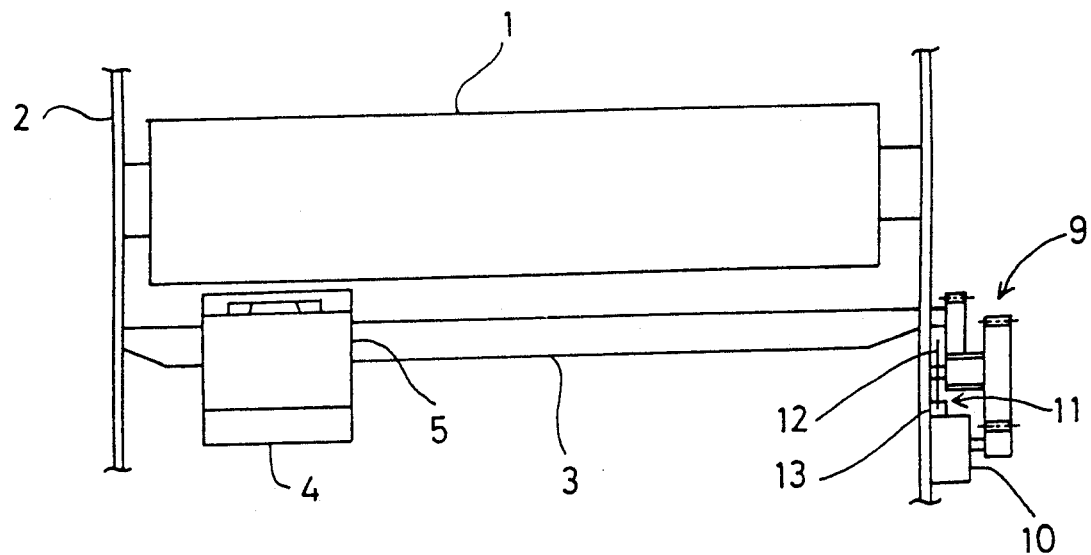
FIG. 5 is a plan view showing the print head, the platen and their surroundings.

The paper thickness detector will be described with reference to FIGS. 4 and 5. In FIGS. 4 and 5, a platen 1 is rotatably supported by a frame 2 and is driven to rotate by a platen motor 32. In front of the platen 1, a carriage guide shaft 3 is disposed in parallel to the platen 1. Both ends of the carriage guide shaft 3 are rotatably supported by the frame 2 and the carriage guide shaft 3 is structured to rotate around an eccentric shaft center as shown in FIG. 4.

Mounted on the carriage guide shaft 3 is a carriage 4 that is capable of reciprocal movement along the carriage guide shaft 3 as driven by carriage motor 30. On the carriage 4, a print head 5 is disposed facing the platen 1. The print head 5 is a wire release type print head and uses electro-magnets or piezo-electric elements as an actuator. A paper meter 6 facing the platen 1 is provided on the print head 5. A printing paper 7 and an ink ribbon 8 are disposed between the print head 5 and the platen 1. In this case, when the carriage guide shaft 3 is rotated, the carriage 4, that is, the print head 5 is moved toward or away from the platen 1.

The carriage guide shaft 3 is driven to rotate by a detecting motor 10 through a gear transmission mechanism 9. On the gear transmission mechanism 9 is a revolution detector 11 for detecting the degree of revolution of the carriage guide shaft 3. The revolution detector 11 comprises an encoder having, for example, a rotating disk 12 and a photo sensor 13. The amount of movement of the print head 5, that is, the distance between the print head 5 and the platen can be detected by the degree of revolution determined by the revolution detector 11.

The initial position of the print head 5, that is, the initial distance between the print head 5 and the platen 1 is stored in the ROM 24 during manufacture at the factory. When the thickness of a printing paper 7 is to be detected, the carriage guide shaft 3 is driven to rotate by the detecting motor 10 and the print head 5 is moved to approach the platen 1. When further movement of the print head 5 is prevented by the abutment of the tip portion of the paper meter 6 against the platen 1, with a printing paper 7 between them, generation of pulses from the revolution detector 11 ceases and the immovable state of the print head 5 is detected.

At this time, since the stop position of the print head 5 is detected by the revolution detector 11 and stored in the RAM 22, the thickness of the printing paper 7 is determined by the CPU 26 based on the detected stop position stored in the RAM 22 and the initial position, that is, the initial distance stored in the ROM 24. The detecting motor 10 is rotated in the reverse direction and the print head 5 is withdrawn from the platen 1 a distance to provide a specified gap, as stored in the ROM 24, between the tip of the print head 5 and the printing paper 7 and stopped.

When the thickness of the printing paper 7 detected by the above-mentioned automatic paper thickness detector is less than 0.35 millimeter, the printing paper is judged to be one-part paper, and when the thickness of the paper is more than 0.35 millimeter, the printing paper is judged to be multi-part paper.

According to the present embodiment having the structure as described above, an optimum printing speed and an optimum brake pulse width, or an optimum printing speed and an optimum energizing period of time for the dots, beginning with the second dot of a continuous dot train, can be selected as shown in the table of FIG. 1 based on the printing mode such as a kanji, ANK, multi-part, and two-pass so that in any of the printing modes satisfactory printing quality can be obtained, printing can be performed at the highest possible printing speed and the printing efficiency can be improved.

The above-described embodiment is structured such that only in a standard speed printing mode, a printing speed, a brake pulse width (BP), a first energizing period of time for the first dot (DP1) and an energizing period of time for the second and successive dots (DP2), are selected and set based on the printing mode. In place of this, however, a structure in which a printing speed, a brake pulse width, a first energizing period of time for the first dot and an energizing period of time for the second and successive dots can also be selected and set based on each of the defined printing modes in any of the printing speed modes, such as 1.5-times standard printing speed mode, 2-times standard printing speed mode, or 3-times printing standard speed mode.

What is claimed is:

1. A method of setting a printing speed in a printer, comprising the steps of:
    identifying a desired speed;
    determining whether a paper being printed on is one-part paper;
    determining whether the printing is to be done in one pass;
    identifying a type of printing to be done; and
    setting an optimum printing speed and a second printing characteristic from a group consisting of an optimum brake pulse width and an optimum drive pulse width of a second and subsequent dots based on the type of printing, wherein the type of printing is comprised of a group of modes consisting of an ANK mode, a multi-part paper mode and a two-pass printing mode.

2. The method as claimed in claim 1, wherein said multi-part paper mode also includes image printing and character ornamentation printing.

3. The method as claimed in claim 1, wherein when it is determined that the printing is to be done in more than one pass, the setting an optimum printing speed step is done based upon the two-pass printing mode and the step of identifying a type of printing is skipped.

4. The method as claimed in claim 1, wherein when it is determined the paper being printed on is a multi-part paper, the step as follows is executed:
    determining if printing is to be done in one pass, when yes, setting the optimum printing speed and the second printing characteristic appropriate to the multi-part paper mode and when no, setting the optimum printing speed and the second printing characteristic appropriate to the two-pass printing mode.

5. The method as claimed in claim 1, further comprising the step of determining whether a line contains mixed modes and setting the optimum printing speed and the second printing characteristic appropriately.

6. The method as claimed in claim 1, wherein said group of printing modes further includes a kanji printing mode.

7. An apparatus for setting a printing speed in a printer, comprising:
    means for identifying a desired speed;
    means for determining whether a paper being printed on is one-part paper;
    means for determining whether the printing is to be done in one pass;
    means for identifying a type of printing to be done; and
    means for setting an optimum printing speed and a second printing characteristic from a group consisting of optimum brake pulse width and an optimum succeeding energizing pulse energy based on the type of printing, wherein the type of printing is comprised of a group of modes consisting of an ANK mode, a multi-part paper mode and a two-pass printing mode.

8. The apparatus as claimed in claim 7, wherein said multi-part paper mode also includes image printing and character ornamentation printing.

9. The apparatus as claimed in claim 7, wherein when it is determined that the printing is to be done in more than one pass, the means for setting an optimum printing speed sets the optimum printing speed based upon the two-pass printing mode.

10. The apparatus as claimed in claim 7, wherein, when it is determined the paper being printed n is a multi-part paper the means for determining if printing is to be done in one pass determines printing is to be done in one pass and sets the optimum printing speed and the second printing characteristic appropriate to the multi-part paper mode and when it determines printing is not to be done in one pass, sets the optimum printing speed and the second printing characteristic appropriate to two-pass printing mode.

11. The apparatus as claimed in claim 7, further comprising means for determining whether a line contains mixed modes and setting the optimum printing speed and the second printing characteristic appropriately.

12. The apparatus as claimed in claim 7, wherein said group of printing modes further includes a kanji printing mode.

* * * * *